United States Patent [19]

Pershinske

[11] Patent Number: 5,035,670
[45] Date of Patent: Jul. 30, 1991

[54] CUTTER HEIGHT ADJUSTMENT MEANS

[75] Inventor: James E. Pershinske, McHenry, Ill.

[73] Assignee: Gregor Jonsson Associates, Inc., Highland Park, Ill.

[21] Appl. No.: 524,331

[22] Filed: May 16, 1990

[51] Int. Cl.⁵ ............................................. A22C 29/02
[52] U.S. Cl. ............................................. 452/5; 452/3
[58] Field of Search .............................. 452/5, 2, 3, 1

[56] References Cited

U.S. PATENT DOCUMENTS

| | | | |
|---|---|---|---|
| 3,751,766 | 8/1973 | Jonsson | 452/5 |
| 4,210,982 | 7/1980 | Hoffman et al. | 452/3 |
| 4,393,544 | 7/1983 | Lapeyre et al. | 452/5 |
| 4,472,858 | 9/1984 | Keith | 452/3 |
| 4,769,871 | 9/1988 | Beits | 452/5 |

Primary Examiner—Willis Little
Attorney, Agent, or Firm—Marshall, O'Toole, Gerstein, Murray & Bicknell

[57] ABSTRACT

Adjusting apparatus for a shrimp processing machine to adjust the depth of a rotary cutting blade relative to a shrimp clamping assembly in which a plurality of different width shims, each adapted to be moved independently of the other shims, are rotatably fixed to a pin extending from a mounting bracket attached to a machine frame post. The shims can be moved from an operative to inoperative position to permit varying depths of cut for the shrimp cutter blade.

19 Claims, 3 Drawing Sheets

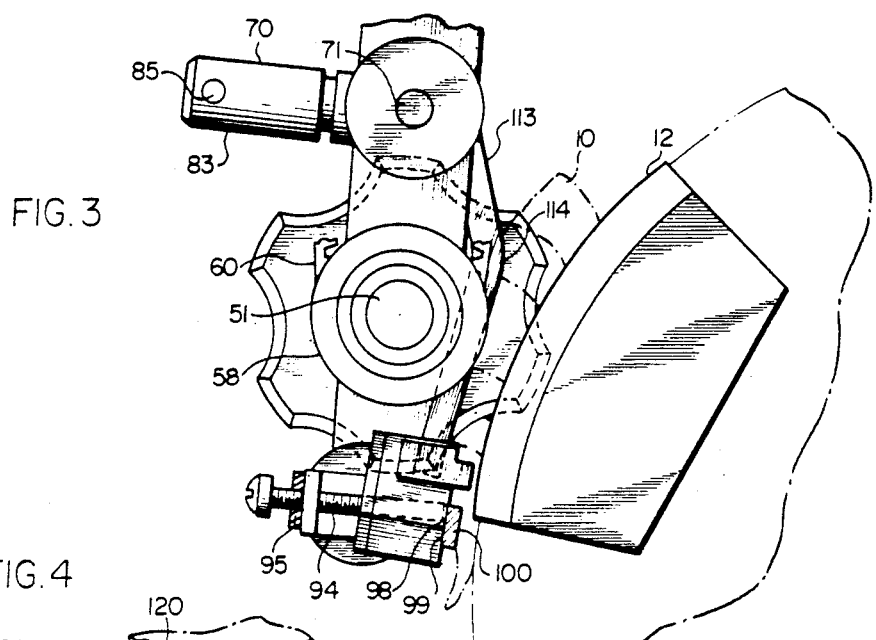
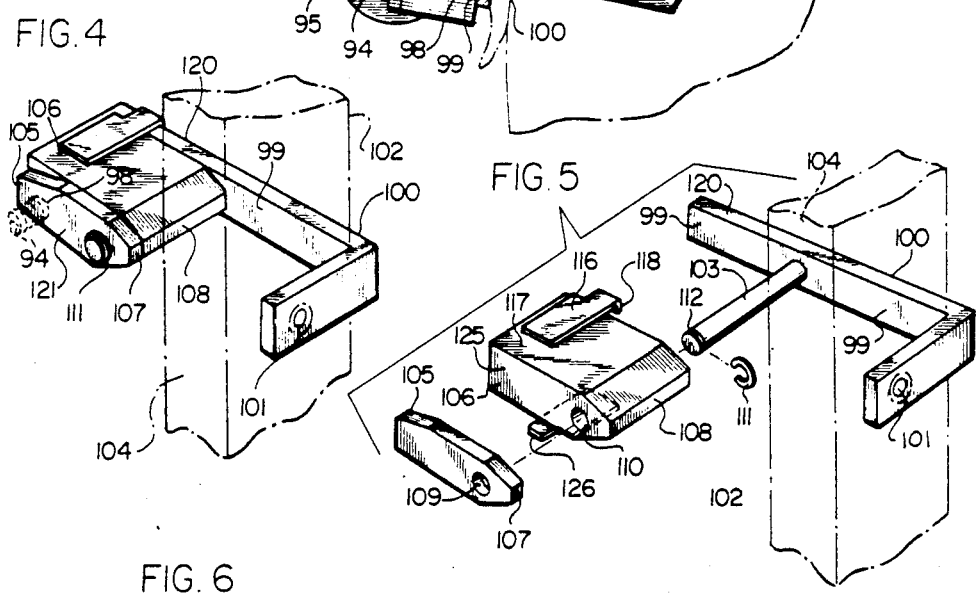
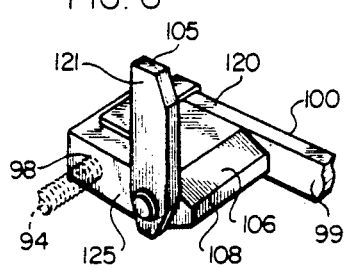
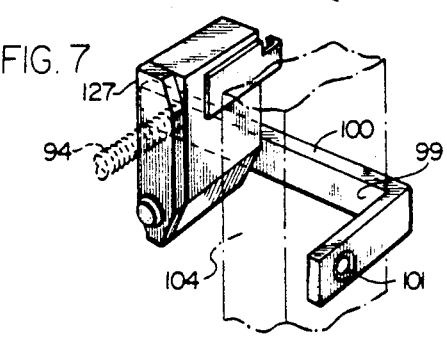

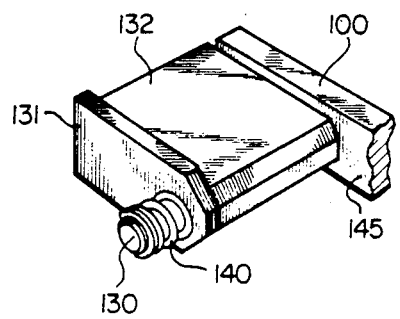
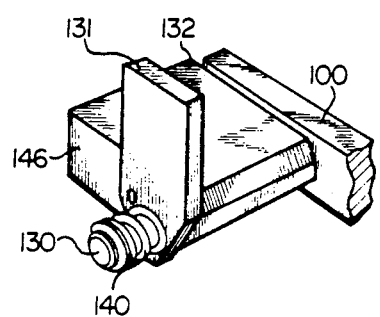
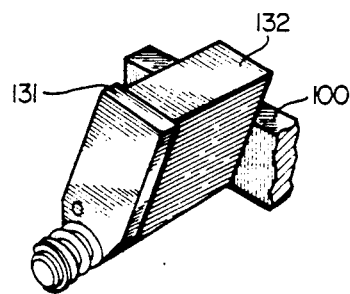
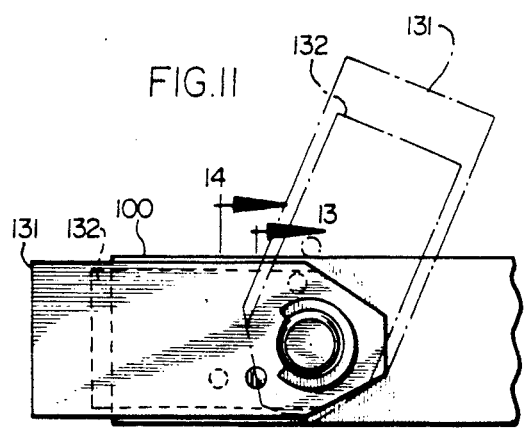
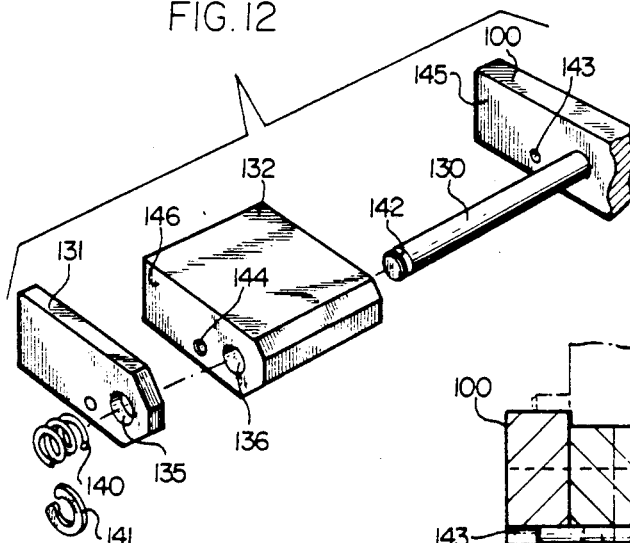
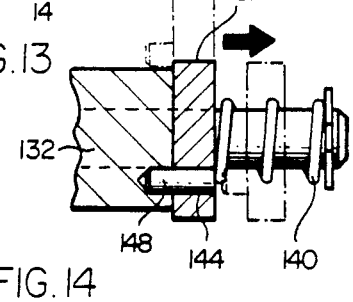
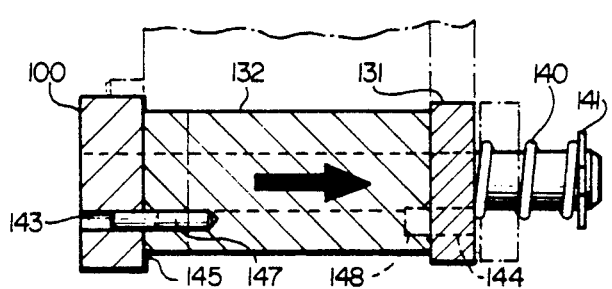

CUTTER HEIGHT ADJUSTMENT MEANS

FIELD OF INVENTION

This invention relates to a new, improved and nonobvious shrimp peeling cutter guide assembly and, more particularly, to an improved adjustment assembly for adjusting the depth of a cutter blade which enters a shrimp being processed in a shrimp peeling machine.

BACKGROUND OF THE INVENTION

There are a number of production machines presently utilized in the shrimp processing industry for cutting and deveining shrimp and removing shrimp shells and tails. In a typical operation, shrimp are clamped to various assemblies oh a rotary turret wheel. The assemblies are rotated past various work stations where the clamped shrimp are cut, deveined and the shrimp shell and/or tail is removed. Other operations can be performed on the shrimp, if desired. Equipment employed in shrimp processing operations are illustrated, for example, in U.S. Pat. Nos. 4,472,858, 3,751,766, 3,159,871 and 3,122,777.

The processing equipment includes means for adjusting various tools that perform particular operations on the shrimp. One operation, for example, involves the cutting of a shrimp along its longitudinal axis. Adjusting means are required to regulate the depth of cut of the cutter blade which cuts the shrimp.

One patent which discloses a shrimp cutter assembly is U.S. Pat. No. 4,472,858 issued Sept. 25, 1984, entitled "Guide and Cutter Depth Control Apparatus." That patent discloses a rotary cutter blade assembly that is fixed relative to a shrimp disposed on a clamp assembly. The cutter blade is adapted to be positioned at different locations to permit selective depths of cuts in the shrimp.

While the cutter blade assembly used to cut shrimp to varying depths disclosed in the '858 patent has been found satisfactory in most instances, there are some occasions where the means for adjusting the cutter blade to a selective depth have not been entirely satisfactory.

Presently, the method for adjusting the cutter blade requires that an individual utilize various tools to provide the depth adjustment. Specifically, a service personnel or machine operator must use a screw driver and wrench to turn a screw means and lock nut to particular positions in order for the cutter blade to be moved from one position to another. The adjustment procedure requires the use of specific tools and it takes a certain amount of time to achieve the desired blade cutting depth.

In various processing applications it is desired to process several styles of shrimp. For example, one may choose to have a "butterfly" style cut as opposed to a "western" style cut. In a western style cut, the shrimp is cut to a deeper depth than in the case of a butterfly cut. It has been found that operators, for any number of reasons, sometimes fail to make the necessary cutter blade adjustment to change over from one style cut to another style cut. As a result, the desired cut for a particular style of shrimp is not made.

It is believed the fact that tools are required to make the necessary cutter depth adjustment causes one to either forget or ignore the blade adjustment simply because they do not have the tools immediately available or the operator does not know how to employ the tools to make the adjustment. As a result, a particular style of shrimp is not cut in the proper manner, whereupon the improperly cut shrimp must be discarded or are sold at a reduced price.

It is believed that there are about three cutting blade depths normally employed for cutting shrimp in approximately ninety percent (90%) of shrimp cutting operations. What is desired is to have a shrimp cutter blade assembly which can be relatively easily adjusted to provide the desired depth of cut for a shrimp rotary cutter blade.

It is further desired that selective adjustment be available without the need for tools; that the adjustment be accomplished in a relatively quick and simple manner; and, that personnel having little mechanical aptitude be able to accomplish the adjustment.

It is also particularly desired that a knife blade adjustment be available on the machines so that machine operators or other personnel will undertake to perform a necessary knife adjustment at the appropriate time in order that the proper style cut of shrimp, e.g., "western," "butterfly," etc., can be achieved.

SUMMARY OF THE INVENTION

The invention disclosed and claimed herein accomplishes the above-referenced desires and obviates the problems associated with shrimp cutting assemblies presently available.

Briefly, the present invention utilizes a structure in which a plurality of cutter blade stops or shims are utilized in association with a shrimp cutter blade adjustment assembly. When a particular style of shrimp cut is to be made such that an adjustment in the cutter blade depth must be made, a shim or stop can be lifted manually into or out of its normal position whereupon the adjusted blade position is achieved without the use of any tools. Depending upon the position to which one or more shims have been moved, an adjusting screw will be indexed further from or closer to a shrimp frame member. The adjustment screw is connected to a rotary cutter blade assembly such that the rotary cutter blade also moves closer to or further away from the shrimp positioned on a shrimp clamp assembly. One or more shims are employed in the adjustment assembly of the present invention with generally two shims being provided. It has been found that utilization of two different size shims for adjustment purposes serves to provide three cutter blade depth positions which accounts for the majority of shrimp peeling applications.

These and other advantages will become more apparent from a further understanding of the drawings and detailed description.

DESCRIPTION OF THE DRAWINGS

FIG. 3 shows the cutter blade assembly of FIG. 2 with two cutter blade adjustment shims disposed in an inoperative position whereby a shrimp cutter blade is positioned to cut a shrimp to the maximum depth;

FIG. 4 shows a partial, perspective view of the cutter blade adjustment assembly of the present invention positioned on a shrimp peeling machine frame post;

FIG. 5 shows a partial, perspective view of the cutter blade adjustment assembly of FIG. 4 with the component parts displayed in a disassembled position;

FIG. 6 shows a partial, perspective view of the cutter blade adjustment assembly of the present invention with one of the adjustment shims disposed in an inoperative position;

FIG. 7 shows the cutter blade adjustment assembly of FIG. 6 with two adjustment shims moved to inoperative positions;

FIG. 8 shows a perspective view of a second embodiment of an adjustment shim assembly of the present invention;

FIG. 9 shows the adjustment shim assembly of FIG. 8 with one of the adjustment shims moved to a second position from the position shown in FIG. 8;

FIG. 10 shows a side view of the adjustment shim assembly of FIG. 8 with the adjustment shims being moved to a second position from the position shown in FIG. 8;

FIG. 11 shows a side view of the adjustment shim assembly of FIG. 8 with the adjustment shims also being illustrated by phantom lines in a second position;

FIG. 12 shows a partial, perspective view of the adjustment shim assembly of FIG. 8 with the component parts displayed in a disassembled position;

FIG. 13 shows a cross section view taken along lines 13—13 in FIG. 11; and,

FIG. 14 shows a cross-section view taken along lines 14—14 in FIG. 11.

DETAILED DESCRIPTION

Figure 1:
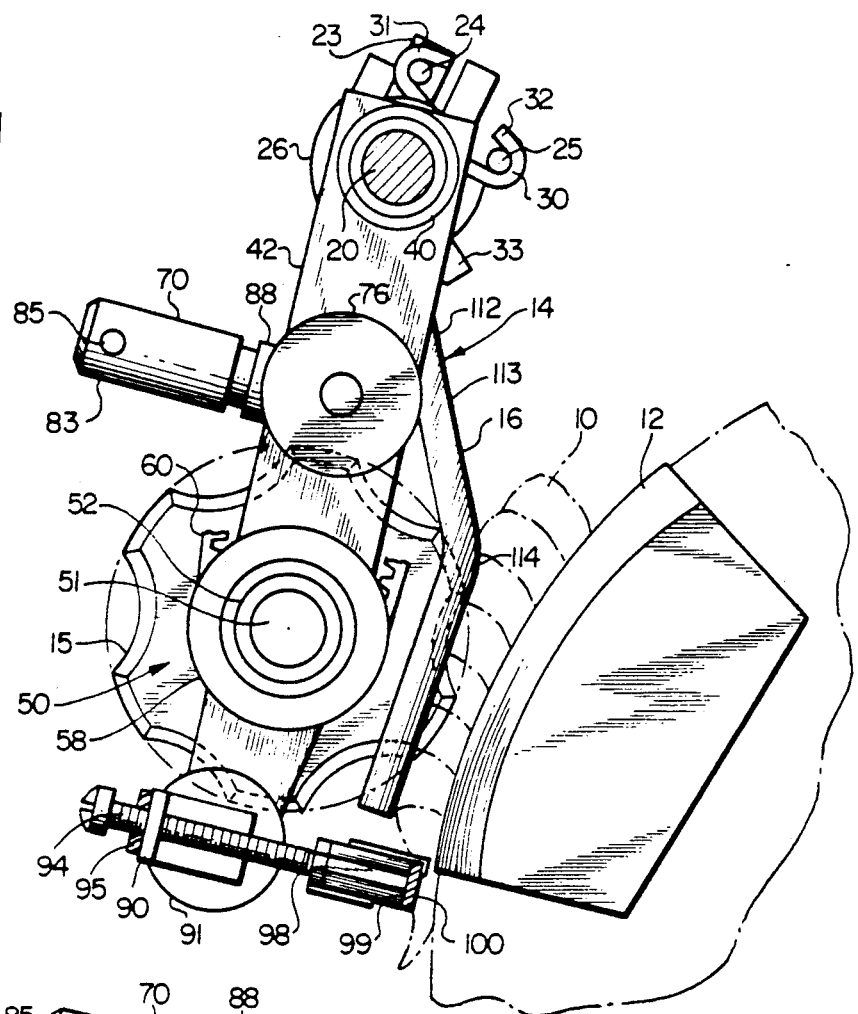
FIG. 1 shows a side elevation view of a shrimp cutter blade assembly positioned relative to a shrimp disposed in a shrimp clamp assembly located on a rotatable turret wheel.

Referring to the drawings and more particularly FIG. 1, shrimp 10 is fixed in clamp assembly 12 which is disposed on a rotatable turret wheel. The wheel is adapted to index a plurality of shrimp clamp assemblies 12 past a plurality of various work stations. At each work station, a shrimp processing operation is performed upon a shrimp located in a clamp assembly. The utilization of a shrimp conveying and transport system is described in greater detail, for example, in U.S. Pat. No. 3,247,542, entitled "Machine For Cleaning Shrimp," the disclosure of which is incorporated by reference herein.

One shrimp processing station is illustrated at 14 where cutting blade 15 cuts shrimp 10 to a selected, predetermined depth. As shrimp 10 approaches cutting station 14, the shrimp initially engages a shrimp guide assembly 16 which guides and maintains shrimp 10 in proper position as the shrimp travels through station 14. The details of the cutting blade assembly 14 is described in greater detail in U.S. Pat. No. 4,472,858, entitled "Guide and Cutter Depth Control Apparatus," the disclosure and claims of which are expressly incorporated by reference herein.

Shaft 20 is fixed to a suitable frame support, not shown. A first anchor stud 24 extends outward from clamp block 23 which is clamped to shaft 20. A second anchor stud 25 extends outward from and is fixed to bearing bushing 26 which is rotatable about shaft 20. Torsion spring 30 has one end 31 attached to the first anchor stud 24 while the remaining spring end 32 is attached to the second anchor stud 25 thereby serving as a spring means for biasing bushing 26 on shaft 20. A guide bar stop 33 is fixed to and depends from a collar keyed to shaft 20.

Bearing bushing 40, which is rotatable about shaft 20, is fixed at one end to a rotatable arm 42 which extends radially from shaft 20.

Cutting blade assembly 50 is connected to arm 42. Rotatable shaft 51 passes through a first bushing sleeve disposed in a bore in arm 42. Pulley 58 is fixed to shaft 51 adjacent a second bushing assembly by means of a suitable clamping screw, not shown. Belt 60 connects pulley 58 to another drive pulley, not shown, located on a drive shaft. Actuation of the drive shaft causes rotation of shaft 51 and rotary cutting blade 15 fastened to shaft 51.

Between shafts 20 and 51, a first cutter blade adjusting assembly 70 is positioned. Cam support shaft 71 passes through a bore in arm 42. A cam, not shown, adjustable by a knurled adjustment knob 76 is fixed by suitable fastener means to one end of cam support shaft 71. Rotation of knob 76 causes rotation of shaft 71 and the cam whereby a desired cam surface can be rotated into position relative to cutter guide bar 112 whereby, depending upon the particular cam surface selected, cutter blade 15 extends a desired depth through a guide slot in guide bar 112.

Stud 83 threaded at one end passes through a bore in yoke base 88 and is screwed into a threaded opening in arm 42. A tee-handle 85 extends through stud 83 adjacent the outboard stud end. As stud 83 is threaded inwardly into arm 42, it draws a pair of spaced yoke legs together against cam support shaft 71 sufficiently to preclude shaft 51 from rotation whereby the shaft and cam are locked in position.

Guide bar 112 is fixed at one end to bearing support bushing 26 and extends radially outward from the bushing. Bar 112 includes a first portion 113 and a second curved portion 114 angularly disposed to first portion 113 at an angle of approximately 30°. Bar 112 preferably comprises a one piece member made of stainless steel or other suitable rigid material. Bar 112 is fixed to spring biased bushing 26 and is adapted to be urged in the direction toward the shrimp transport means.

The above disclosure is, for the most part, utilized in shrimp peeling assemblies presently available and is described in the '858 patent.

Turning to the outboard end of arm 42, bar 90 is connected to and extends laterally outward from arm 42 and is separated therefrom by cam roller 91. A leaf spring, not shown, or other suitable biasing means is adapted to seat against bar 90 and serves to urge arm 42 in a direction toward the turret wheel or shrimp transport means. Screw 94, which serves as an adjusting member, is threaded through bar 90 and is locked in a desired position by lock nut 95 whereby screw end 98 is adapted to seat against side wall 121 of shim 105 or side wall 125 of shim 106 (FIG. 6) attached to frame support member 100. Adjustment of screw 94 relative to the fixed surface 99 limits the rotational movement of arm 42 and cutting assembly 50 about shaft 20 as arm 42 is urged toward the shrimp transport means or turret wheel by the leaf spring.

It is observed that adjustment of the depth of cutting blade 15 relative to the shrimp is accomplished by the adjustment means located at the outboard end of arm 42. When lock nut 95 is released and screw 94 is turned, arm 42 and blade assembly 50 move closer to or further from clamp assembly 12.

Referring to FIGS. 4 and 5, bracket or frame connector member 100 is fixed to frame post 102 by a suitable fastener means, not shown, at location 101. Pin 103 is fixed at one of its ends to bracket 100 and extends outwardly, perpendicular to post wall 104. Shims 105 106 each having different shim widths 107, 108 have bore 109, 110 located at one end of each shim. Each bore extends throughout the width of the respective shim and is slightly larger in diameter than the diameter of pin 103. In assembly, shims 105, 106 are disposed on pin 103 and a lock washer 111 is inserted in groove 112 on pin 103 to lock the shims in pivoting position on pin 103.

Shim 106 is substantially wider than the width of shim 105. A first stop arm 126 is fixed by welding or other fastening means to the bottom surface 127 of shim 106. Arm 126 extends outwardly from shim 106 as seen in FIG. 5 and serves as a shim stop for limiting the travel of shim 105. Shim 105 is normally adapted to seat on arm 126.

A second stop arm 116 is welded or attached by other suitable fastening means to the top surface 117 of shim 106. Arm 116 extends outwardly from the shim in the direction opposite the direction of extension arm 113. A tab 118 depends from the outboard end of arm 116.

When shim 106 is positioned on pin 103, arm 116 seats on bracket arm 120 and serves as a shim stop means for limiting the travel of shim 106. Shim 105, which is also fixed to pin 103, seats on extension arm 126.

It will be observed in FIG. 4, for example, that the free end 98 of adjustment screw 94 contacts side wall 121 of shim 105. In this particular position, arm 42 is positioned a predetermined distance from shrimp clamp assembly 12, whereby, as seen in FIG. 1, cutter blade 15 is located in a desired cutting position relative to a shrimp 10 fixed in clamp assembly 12.

Figure 2:
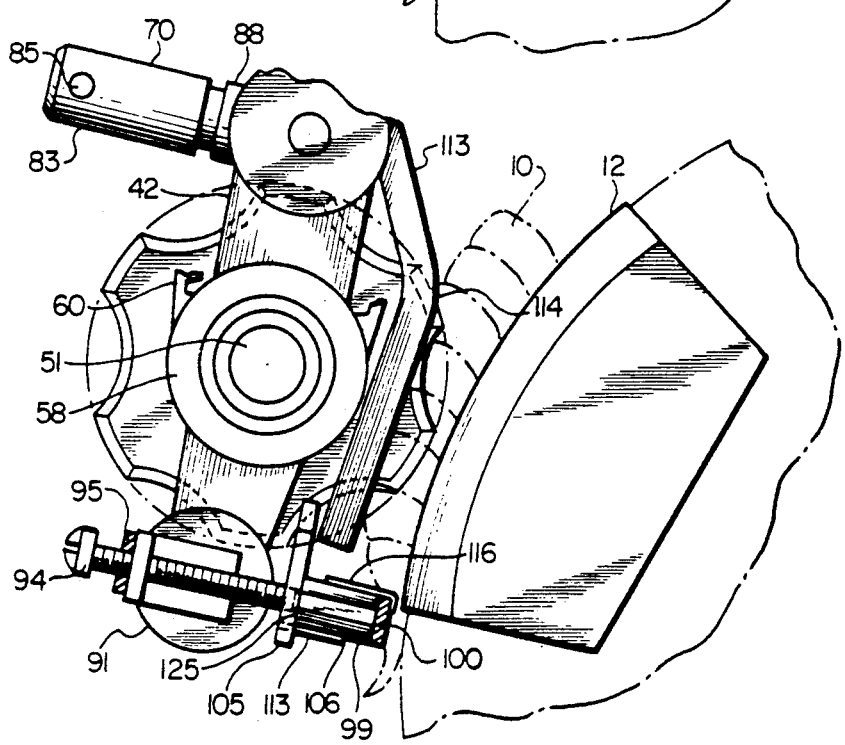
FIG. 2 shows a partial side elevation view of the cutter blade assembly of FIG. 1 with the cutter blade disposed in a different position than the blade position of FIG. 1 and an adjustment shim moved to an inoperative position.

When it is desired to adjust cutter blade assembly 50 to a different cutter depth from that shown in FIG. 1, shim 105 can be pivoted upwardly away from arm 126 to an inoperative position whereupon the outboard end 98 of screw 94 attached to the biased arm 42 abuts side wall 125 of shim 106 as seen in FIGS. 2 and 6. In this position, cutter blade 15 is moved further inward relative to shrimp clamp assembly 12.

In the event a deeper cut of shrimp is desired such as in the case of a "western" style cut, shims 105, 106 are pivoted upwardly to inoperative positions as shown in FIGS. 3 and 7 whereupon the outboard end 98 of screw 94 makes no contact with surface 121 or surface 125 and cutter blade 15 is moved to a new cutter depth position.

It is appreciated that while two shims 105, 106 have been shown, additional shims could be utilized, if desired, for adjustment purposes. Moreover, the width of the shims could vary as opposed to having the particular shim widths illustrated in the drawings. It has been found that having two shims, 105, 106, with widths of about 0.125 and 0.875 inches, the desired cutter blade depth locations can be achieved for most shrimp processing applications that will be encountered. If required, the cutter blade assembly can be further finely adjusted by releasing lock nut 95 and turning the threaded screw 94 a desired amount.

Referring to FIGS. 8-13, there is shown a further embodiment of the adjustment shim assembly utilized with the present invention. In this embodiment, a pin 130 is fixed at one of its ends to bracket 100 and extends outwardly perpendicular to wall 145. Shims 131, 132 each having different shim widths 133, 134 have bores 135, 136 located at one end of each shim. Each bore extends through the width of the respective shim and is slightly larger in diameter than the diameter of pin 130.

A biasing means in the form of compression spring 140 is adapted to be inserted on pin 130. In assembly, shims 131, 132 are disposed on pin 130 after which spring 140 is placed on the pin. A lock washer 141 is inserted in groove 142 on pin 130 to lock shims 131, 132 in a biased, pivotable position on pin 130.

Holes 143, 144 are drilled or otherwise formed in wall surface 145 of bracket 100 and wall surface 146 of shim 132. Detents 147, 148 extending from shims 131, 132 are adapted to fit within respective holes 143, 144.

Shim 132 is adapted to be locked to bracket 100 by detent 147 which is disposed in hole 143 whereas shim 131 is adapted to be locked to shim 132 by detent 148 which is disposed in hole 144. Simply compressing spring 140 by pulling one or both shims away from bracket 100 will allow one or both detents 147, 148 to be removed from openings 143, 144 whereby one or both shims can be pivoted about pin 130 to an inoperative position at which location the spring is released and the shims are again biased in the desired position.

While several embodiments of the invention have been herein illustrated and described in detail, it will be understood that modifications and variations thereof may be effected without departing from the spirit of the invention and the scope of the appended claims.

We claim:

1. Apparatus for adjusting the position of a shrimp cutting blade relative to a shrimp clamp assembly on which a shrimp is fixed and adapted to be cut, said apparatus comprising:
   a pivotable arm upon which a cutter blade is disposed;
   an adjusting member connected to said pivotable arm;
   an adjusting assembly for adjusting the position of said adjusting member, said assembly comprising a shim retention member;
   at least one shim connected to said shim retention member and including means for moving said shim into an operative position whereby said shim contacts said adjusting member to an inoperative position whereby said shim is free of contact with said adjusting member whereby said pivotable arm and blade are maintained at a first spaced distance from said clamp assembly when said adjusting member contacts said shim and at a second distance, which is less than the first distance, when said adjusting member is located in an inoperative position.

2. Apparatus in accordance with claim 1 wherein said shim adjusting means comprises:
   a pin fixed to and extending outward from said shim retention member;
   at least one shim having a predetermined width and two ends;
   said shim having a bore located contiguous to one shim end, said bore extending through shim width;
   said pin extending through said shim bore whereby said shim is adapted to rotate on said pin;
   locking means to lock said shim on said pin; and,
   stop means for limiting the travel of said shim about said pin.

3. Apparatus in accordance with claim 2 wherein a plurality of shims are disposed on said pin; and, means for rotating each of said shims independently of the other.

4. Apparatus in accordance with claim 3 wherein each shim has a different width.

5. Apparatus in accordance with claim 4 wherein at least one of said shims includes a first stop arm for limiting the travel of at least one shim.

6. Apparatus in accordance with claim 5 in which said shim also includes a second stop means for limiting the travel of a second adjacent shim about said pin.

7. Apparatus for adjusting the position of a rotatable shrimp cutting blade relative to a clamp assembly on which a clamped shrimp is to be cut, said apparatus comprising:
- a pivotable arm upon which a rotatable cutter blade is disposed;
- an adjusting member connected to said pivotable arm;
- an adjusting assembly for adjusting the position of said adjusting member, said assembly comprising a shim retention member;
- a plurality of shims connected to said shim retention member and each shim including means for moving said shim into an operative position contacting said adjusting member to an inoperative position free of contact with said shim member.

8. Apparatus in accordance with claim 7 in which each shim is independently movable of the other.

9. Apparatus in accordance with claim 8 in which said shims each have a different width.

10. Apparatus in accordance with claim 9 and further including stop means on at least one of said shims for limiting the rotation of said shims about said pin.

11. Apparatus in accordance with claim 10 wherein said shim stop means comprises an arm means attached to and extending outward from said shim.

12. Apparatus in accordance with claim 11 and further including means for positioning each shim between said shim retention member and the end of said adjusting member whereby said adjusting member is adapted to be disposed in any of several positions relative to said clamp assembly.

13. Apparatus in accordance with claim 12 wherein said adjusting member is a screw.

14. Apparatus in accordance with claim 2 and further including a means for biasing said shim toward said shim retention member.

15. Apparatus in accordance with claim 14 in which said biasing means comprising a compression spring disposed on said pin whereby said shim detent is compressively retained in said opening.

16. Apparatus in accordance with claim 15 in which said shim has a detent disposed on said shim retention member and said shim has an opening therein to receive said detent.

17. Apparatus for adjusting the position of a shrimp cutting blade relative to a shrimp clamp assembly on which a shrimp is adapted to be fixed and cut, said apparatus comprising:
- a pivotable arm upon which a cutter blade is disposed;
- an adjusting member connected to said pivotable arm;
- an adjusting assembly for adjusting the position of said adjusting member, said assembly comprising:
- a shim retention member;
- a pin extending outward from said shim retention member;
- at least one shim having an opening extending throughout its width, said shim being pivotally disposed on said pin;
- a biasing means for urging said shim in the direction of said retention member;
- means for locking said shim to said pin; and,
- means for releasably locking said shim in one or more positions relative to said retention member.

18. Apparatus in accordance with claim 17 and further including a plurality of shims similar to the first shim but having varying widths;
- each of said shims being moveable, independent of the other shims.

19. Apparatus in accordance with claim 17 wherein said locking means includes a detent on said shim and an opening in said retention member adapted to receive said detent.

* * * * *